United States Patent [19]
Rawson et al.

[11] Patent Number: 5,370,068
[45] Date of Patent: Dec. 6, 1994

[54] COULTER FERTILIZER APPLICATOR UNIT

[75] Inventors: Ray Rawson; Allen Rawson, both of Farwell, Mich.

[73] Assignee: Unverferth Manufacturing Co., Inc., Kalida, Ohio

[21] Appl. No.: 87,453

[22] Filed: Jul. 9, 1993

Related U.S. Application Data

[62] Division of Ser. No. 807,245, Dec. 16, 1991.

[51] Int. Cl.⁵ .............................................. A01C 15/00
[52] U.S. Cl. ....................... 111/121; 111/120; 239/516
[58] Field of Search ............... 111/127, 118, 120–126; 172/4.5, 705, 643; 239/516, 288.3, 587.1, 273, 588, 149

[56] References Cited

U.S. PATENT DOCUMENTS

| Re. 25,307 | 12/1962 | Johnston . | |
|---|---|---|---|
| Re. 27,295 | 2/1972 | Pechacek . | |
| 2,805,613 | 9/1957 | Siems | 172/643 |
| 2,912,944 | 11/1959 | Snow et al. . | |
| 3,588,139 | 6/1971 | Bayne . | |
| 4,048,929 | 9/1977 | Zumbahlen . | |
| 4,205,615 | 6/1980 | Jacobson | 111/120 |
| 4,304,306 | 12/1981 | Maust, Jr. et al. | 172/643 |
| 4,624,193 | 11/1986 | Johnston . | |
| 4,656,957 | 4/1987 | Williamson et al. | 111/121 |
| 4,745,978 | 5/1988 | Williamson | 111/123 |
| 4,987,841 | 1/1991 | Rawson et al. . | |
| 5,027,724 | 7/1991 | Ptacek et al. | 111/121 |
| 5,139,200 | 8/1992 | Greimann et al. | 239/288.3 |

OTHER PUBLICATIONS

Copy–4 pages of document entitled tye No Tills (bottom left hand corner of p. 1 showing printing date of Jul. 1982,.
Copy°page brochure entitled Yetter . . . for land's sake! Conversion attachments the practical way to affordable conservation tillage.
Copy–1 sheet from Farm Industry News, vol. 22, No. 2 and entitled Livestock, dated Feb. 1989 (p. 42).
Copy–2 pages of document entitled No–Till Grain Planter Drill For Soybean And Other Grains by United Farm Tools, Inc.
Copy–2 pages of document entitled Great Plains New Product Bulletin Coulter Caddy.

*Primary Examiner*—Randolph A. Reese
*Assistant Examiner*—Spencer Warnick
*Attorney, Agent, or Firm*—Henderson & Sturm

[57] ABSTRACT

A seedbed preparation apparatus attachable to existing seed planting devices comprising a coulter cart. The apparatus is designed to lessen the number of passes required to prepare and plant a field. Fertilizer delivery is provided to the soil raised by the coulter wheels. The fertilizer injector nozzles are secured to flexible mounting devices to permit the nozzle to move in accordance with the terrain preventing clogging or stoppage of the nozzles.

7 Claims, 2 Drawing Sheets

COULTER FERTILIZER APPLICATOR UNIT

This is a divisional of copending application(s) Ser. No. 07/807,245 filed on Dec. 16, 1991.

BACKGROUND OF THE INVENTION

1. Field of the Invention

The present invention relates generally to earth cultivation methods and an apparatus to carry out the methods. More particularly, the present invention relates to a seedbed preparation method and apparatus comprising a coulter cart. The coulter cart apparatus is attachable to planters or drills to enable the farmer to make fewer passes over the soil by farming machinery.

There are several advantages resulting from the use of the apparatus of the present invention. Since fewer machinery passes are needed, the soil is less compacted and presents a better seedbed thus promoting plant growth. Most importantly, fewer passes over the field saving time and fuel costs.

The present invention allows a farm operator to cultivate, fertilize and plant in one pass by adding the present invention to pre-existing seed planting machinery.

The invention also relates to a device for treating an external body.

The term "external body" as used herein means soil, the earth, any terrain, any liquid body, and any solid or substantially solid object or body.

The terms "device for treating" and "treating device" as used herein mean any device for applying a substance (e.g., fertilizer) or energy form (e.g., heat, light, sound, ultrasound, laser, infrared, ultraviolet, radar, sonar, electrical, magnetic, electromagnetic, nuclear, radioactive, ion beam), or for removing (e.g., vacuum, magnetic) sensing, detecting or measuring a substance, characteristic or energy form.

The term "operating portion" as used herein means nozzle or operating part for applying, removing, sensing, detecting or measuring the aforesaid substance or energy form.

2. Description of the Relevant Art

It is advantageous for the farmer/user to keep the number of passes over a field to a minimum as discussed above. Several devices are known which provide such advantages, including applicant's previous device now U.S. Pat. No. 4,987,841.

Prior art devices failed to provide an easily adjustable, self-contained seedbed preparation apparatus which is mountable to existing planting devices. The self-contained device of the present invention further includes means for storing and carrying fertilizer which is not disclosed in the prior art.

SUMMARY OF THE INVENTION

The present invention provides an apparatus for preparing a seedbed including providing fertilizer to a seedbed. The apparatus includes coulter wheels mounted along a generally H-shaped main frame. The frame includes means for storing fertilizer mounted to the rear of the apparatus. The fertilizer is preferably in liquid form and injected into the soil behind a second row of coulter wheels.

The present invention may suitably comprise, consist of, or consist essentially of, the elements including a generally H-shaped frame or main frame, means for securing the apparatus to a motive force, a plurality of coulter wheels and respective support means or coulter linkage arms, means for applying fertilizer, means for linking the apparatus with a planting apparatus, elevating means for adjusting the depth of the coulter wheels, and means for storing fertilizer mounted on said apparatus.

Preferably, the coulter wheels are spaced equidistantly along the main frame in three rows. The coulter wheels are adjustable horizontally and vertically along the main frame.

The fertilizer injectors are provided to the rear of the last row of coulter wheels. The injectors are mounted upon spring members which permit the injectors to flex with the terrain the apparatus is traversing. Such structure prevents clogging of the injector nozzles.

The invention also provides a device for treating an external body having or substantially uneven surface. The device includes first means for treating at least a portion of the external body. The first means has an operating portion, such as a nozzle, a transducer, or a probe. The device includes second means, such as a spring member, for resiliently, adjustably and releasably supporting at least a portion of the first means as the first and second means move relative to the uneven surface and for preventing contact between the operating portion and any portion of the external body.

It is an object of the present invention to provide a seedbed preparation apparatus, which, when combined with a planting apparatus, prepares the seedbed in a minimum number of passes over the field.

It is a further object of the present invention to provide an apparatus which is adaptable to existing planting equipment.

It is a further object of the present invention to provide fertilizer injection nozzles mounted to spring members to prevent clogging and damage.

It is still a further object of the present invention to provide an apparatus adjustable for the depth of cultivation.

The above and further objects, details, and advantages of the invention will become apparent from the following detailed description, when read in conjunction with the accompanying drawings.

DETAILED DESCRIPTION OF THE PREFERRED EMBODIMENTS

Figure 1:
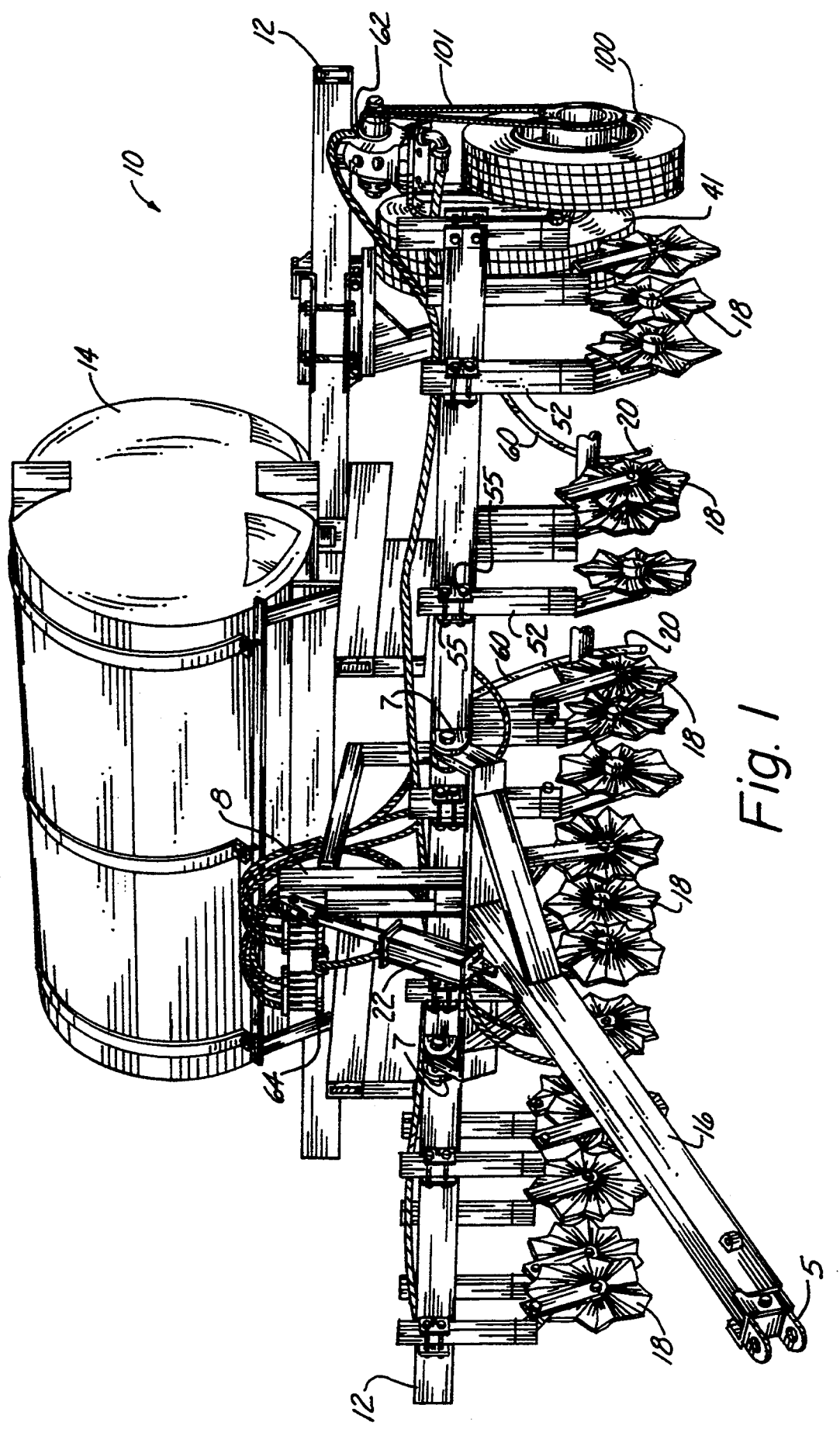
FIG. 1 illustrates a front perspective view of a seedbed apparatus in accordance with the present invention.

As best seen in FIG. 1, the seedbed preparation apparatus comprises a coulter cart 10 having a main frame 12, fertilizer storing means 14, means 16 for securing the apparatus to a motive force, a plurality of coulter wheels comprising seedbed preparation means 18, fertilizer delivery means 20 and lifting means 22.

Figure 3:
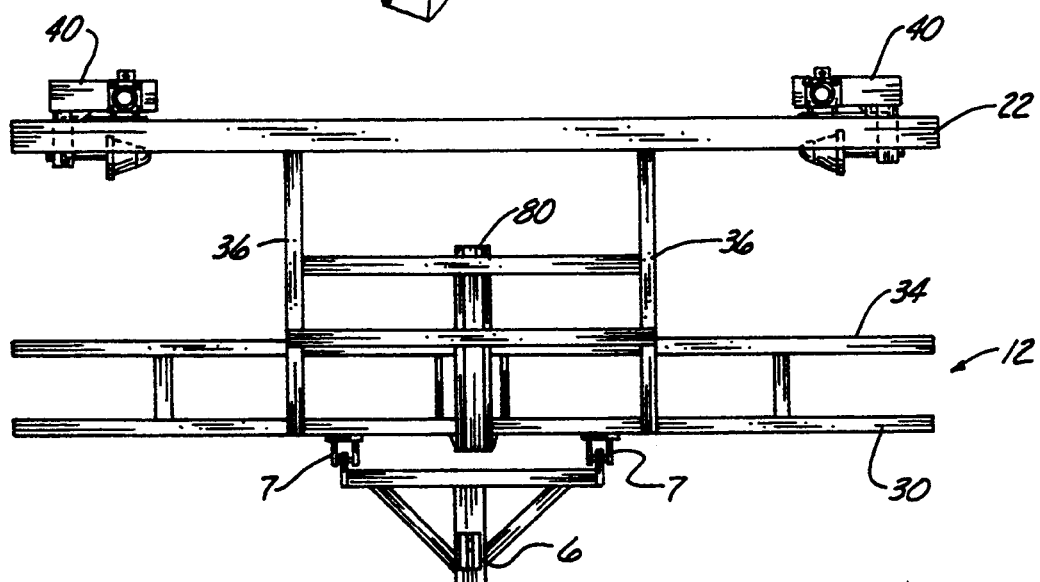
FIG. 3 illustrates a top plan view of the main support frame of the apparatus in accordance with the present invention.

As best seen in FIG. 3, the main frame or support means 12 may preferably, but not necessarily, generally be H-shaped when viewed from the top. A first leg 30 is transverse to the means 16 for securing to a motive force. A second leg 32 is to the rear of the apparatus cart 10 and includes cart axle attachments 40 best seen in FIG. 4. A third leg 34 is located adjacent to the first leg 30 and has coulter wheel linkage arms secured therealong (FIG. 1). Cross members 36 form a cradle for supporting the fertilizer storing means 14 such that the storing means 14 has its weight distributed throughout the main support frame 12 during use.

As best seen in FIG. 1, the means 16 for securing the assembly to a motive force may preferably, but not necessarily, include a hitch assembly 5 and bracket 6 for attaching the lifting means 22. The means 16 may also include hydraulic and/or electrical connections for attachment to the motive force which preferably comprises a tractor (not shown). Pivotal attachment points 7 are provided on the first leg 30 for securement of means 16.

Figure 2:
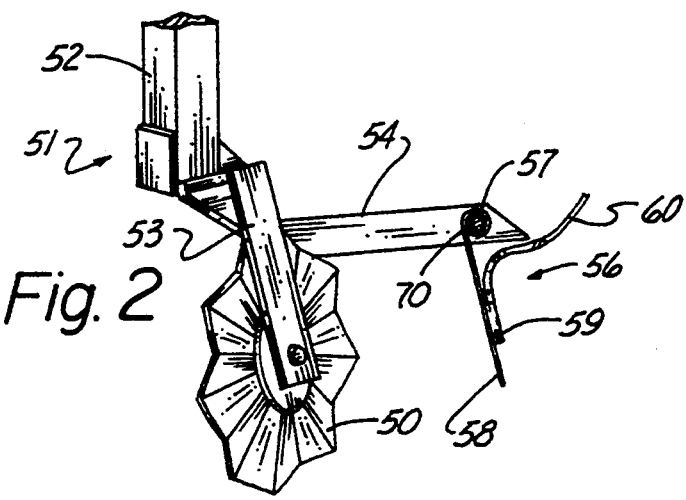
FIG. 2 illustrates a coulter wheel and fertilizer support assembly of the apparatus in accordance with the present invention.

As best seen in FIG. 2, a coulter wheel 50 is rotationally mounted on a linkage arm assembly 51 including a support post 52 and linkage arm 53. Each linkage arm assembly and coulter wheels are identical with the exception of the additional fertilizer applicator attachment arms 54. The arms 54 are only provided on the rearmost row of coulter wheels. The linkage arm extends substantially downwardly and rearward from the lower end of support post 52. The support post 52 stands substantially vertical attached to the main support member of frame 12, either leg 30 or 34.

Figure 5:
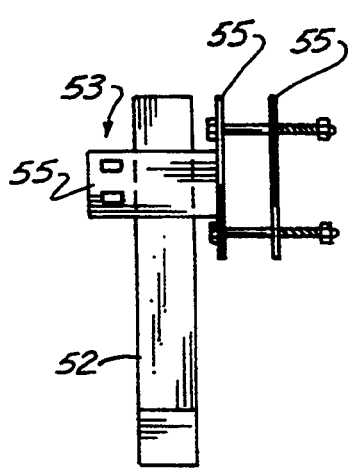
FIG. 5 illustrates a coulter wheel clamping assembly of the apparatus in accordance with the present invention.

As best seen in FIG. 5, the support post 52 is secured at its upper end to the main support member (either leg 30 or 34) by adjustable clamp members 53. Members 53 comprise a pair of interconnected clamp means, a first clamp means secures the post 52 at an appropriate height, the second clamp means secures the assembly 51 horizontally along the main support member. The clamp means utilizes elongate bolt members for tightening opposing plate members 55 against either post 52 or the appropriate main support member. The cart axles 40 are attached to the frame 12 by similar clamping means.

With respect to the fertilizer applicator attachment arm 54 discussed above, arms 54 are provided on the last row of coulter wheel assemblies for supporting second means, such as a spring member 56, at the end farthest from the wheel assembly 51. The spring member 56 includes a coil head 57 comprising several windings of material including means 70, such as a nut and bolt, for securing the spring member 56 to arm 54. Extending from and integral with the head 57 is a tail portion 58 of a length sufficient to contact the ground. Secured to the tail portion is first means for treating, such as a fertilizer injector nozzle 59. Such securement is preferably, but not necessarily, an adjustable and releasable connection. The nozzle 59 is interconnected with fertilizer conveyance means or tubes 60. The tail portion flexes with the contour of the terrain the apparatus is passing over. Such an arrangement prevents clogging of the injector nozzle by soil or plant residue and breakage of the injectors by rocks or other material.

Figure 4:
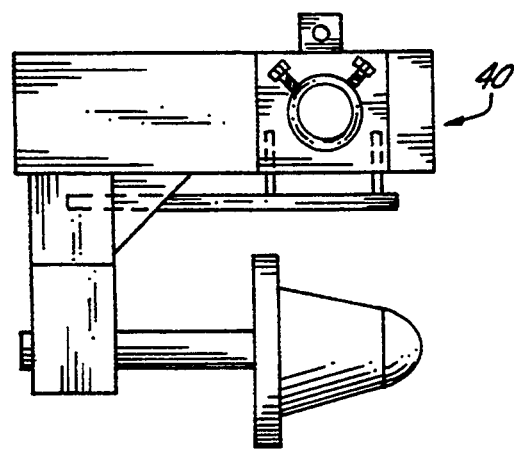
FIG. 4 illustrates a cart axle assembly of the apparatus in accordance with the present invention.

A cart axle attachment 40 is best seen in FIG. 4. The attachment 40 is employed to secure a conventional pneumatic tire 41 to the apparatus 10. A pair of these tires 41 act to ease transportation of the apparatus from location to location. As mentioned previously, these cart axles 41 are secured with clamping means similar to clamp members 53.

Fertilizer storing means 14 comprises a large cylindrical tank which is constructed of material which is resistant to most chemical agents. The tank 14 is secured to the cart apparatus 10 as is known in the art with bands or chains or other equivalent means.

The tank or storing means 14 is connected to means for conveying fertilizer 60 comprising a plurality of tubes via a pump 62. As best seen in FIG. 1, the pump 62 is operated off of a power take off including a tire 100 which turns in response to the motion of the apparatus 10 which moves a chain 101 which is connected to the pump 62. However, it is envisioned that the pump 62 could be electrically operated by connecting it to the motive force electrical system. The pump 62 provides constant pressure in the distribution of fertilizer by the fertilizer conveyance means 60. A distribution center 64 separates the flow of fertilizer to the nozzles 59.

A lifting means 22 comprising a hydraulic cylinder is provided such that, when necessary, one, more or all of the coulter wheels may be elevated off the ground. A first end of the lifting means is secured to bracket 6, the second end to an elevated position 8. When the cylinder is activated and extended the front of apparatus 10 is lifted off the ground. Lifting means 22 is also employed to determine the depth the coulter wheels will be inserted into the seedbed.

A means for attaching a planting apparatus 80 is provided opposite said securing means 16 such that the motive force applied to means 16 is linearly distributed to the planting apparatus.

In a preferred embodiment, the coulter wheels 50 and linkage arm assemblies are provided in groups of threes to provide three rows of wheels. A front row is secured to the front of first leg 30. A second row is secured to the rear of first leg 30 or front of third leg 34. The third row includes attachment arms 54 and is attached to the rear of third leg 34.

Although there has been described what is at present considered to be preferred embodiments of the invention, it will be understood that various modifications and variations may be made therein. It is intended to cover in the appended claims all such modifications as fall within the true spirit and scope of the invention.

We claim:

1. For use with a frame adapted to be moved over soil to be tilled and fertilized, a coulter fertilizer applicator unit comprising:

a support post mounted on the frame;

a coulter wheel flexibly mounted on said support post for tilling engagement with soil over which the frame is moved to form a seedbed therein;

a support arm having a forward end secured to said post and extended rearwardly thereof, a rear end of said support arm disposed rearwardly and beyond said coulter wheel, said support arm being relatively inflexible;

an elongated spring element having a coiled head at an upper end secured to said support arm rear end, said spring having a free, lower end of a length sufficient to engage the soil in a trailing, non-tilling manner, said lower end flexing with the contour of the soil over which said unit is passing; and means attached to said spring free end for applying fertilizer within the seedbed.

2. The invention of claim 1 and further wherein the seedbed prepared by the coulter fertilizer applicator unit is prepared only by said coulter wheel of the coulter fertilizer applicator unit.

3. The invention of claim 2, and further wherein said fertilizer applicator means comprises a nozzle secured to and spaced upwardly and away from the bottom of said spring free end.

4. The invention of claim 3, and further wherein said nozzle is maintained above the soil of the seedbed to prevent plugging of said nozzle.

5. For use with a frame adapted to be moved over soil to be tilled and fertilized, a coulter fertilizer applicator unit comprising:

a support post mounted on the frame;

a coulter wheel flexibly mounted on said support post for tilling engagement with soil over which the frame is moved to form a seedbed therein;

a support arm having a forward end secured to said post and extended rearwardly thereof, a rear end of said support arm disposed rearwardly and beyond said coulter wheel, said support arm being relatively inflexible;

an elongated spring element having a coiled head at an upper end secured to said support arm rear end, said spring having a free, lower end of a length sufficient to engage the soil in a trailing, non-tilling manner, said lower end flexing with the contour of the soil over which said unit is passing; and means attached to said spring free end for applying fertilizer within the seedbed and capable of moving with said free end during the flexing thereof.

6. The invention of claim 5, and further with means for adjustably mounting said spring coiled head to said support arm rear end about a normally horizontal axis transverse to the direction of movement of said unit, whereby said spring element is adjustably movable arcuately about said support arm.

7. The invention of claim 6, and further with said spring element lower end extended substantially straight and rearwardly of said unit.

* * * * *